(12) United States Patent
Gao et al.

(10) Patent No.: US 10,692,220 B2
(45) Date of Patent: Jun. 23, 2020

(54) OBJECT CLASSIFICATION BASED ON DECOUPLING A BACKGROUND FROM A FOREGROUND OF AN IMAGE

(71) Applicant: International Business Machines Corporation, Armonk, NY (US)

(72) Inventors: Peng Gao, Beijing (CN); Guo Qiang Hu, Shanghai (CN); Jing Chang Huang, Shanghai (CN); Jun Chi Yan, Shanghai (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 15/787,483

(22) Filed: Oct. 18, 2017

(65) Prior Publication Data
US 2019/0114781 A1    Apr. 18, 2019

(51) Int. Cl.
*G06T 7/194*    (2017.01)
*G06N 3/08*    (2006.01)
(Continued)

(52) U.S. Cl.
CPC .............. *G06T 7/194* (2017.01); *G06F 16/51* (2019.01); *G06F 16/583* (2019.01);
(Continued)

(58) Field of Classification Search
CPC .......... G06T 7/194; G06T 2207/20081; G06T 2207/20084; G06F 16/583; G06F 16/51;
(Continued)

(56) References Cited

U.S. PATENT DOCUMENTS 8,761,510 B2    6/2014 Russakovsky et al.
8,774,498 B2    7/2014 de Campos et al.
(Continued)

OTHER PUBLICATIONS

Reddy, Vikas, Conrad Sanderson, Andres Sanin, and Brian C. Lovell. "Adaptive patch-based background modelling for improved foreground object segmentation and tracking." In 2010 7th IEEE International Conference on Advanced Video and Signal Based Surveillance, pp. 172-179. IEEE, 2010. (Year: 2010).*
(Continued)

*Primary Examiner* — Carol Wang
(74) *Attorney, Agent, or Firm* — Amin, Turocy & Watson, LLP

(57) ABSTRACT

Techniques facilitating object classification based on decoupling a background from a foreground of an image are provided. A system can comprise a memory that stores computer executable components and a processor that executes the computer executable components stored in the memory. The computer executable components can comprise a model that is trained on images that comprise respective backgrounds and respective foregrounds that are interleaved. The model can be trained to detect the respective backgrounds with a defined confidence level. The computer executable components can also comprise an extraction component that employs the model to identify a background of a received image based on the defined confidence level and to decouple a foreground object of the received image based on identification of the background of the received image.

20 Claims, 11 Drawing Sheets

(51) Int. Cl.
  *G06K 9/62* (2006.01)
  *G06F 16/51* (2019.01)
  *G06F 16/583* (2019.01)
  *G06T 7/11* (2017.01)

(52) U.S. Cl.
  CPC ......... *G06F 16/5838* (2019.01); *G06K 9/624* (2013.01); *G06K 9/6256* (2013.01); *G06K 9/6261* (2013.01); *G06K 9/6262* (2013.01); *G06K 9/6267* (2013.01); *G06K 9/6298* (2013.01); *G06N 3/08* (2013.01); *G06T 7/11* (2017.01); *G06T 2207/20081* (2013.01); *G06T 2207/20084* (2013.01)

(58) Field of Classification Search
  CPC .............. G06F 16/5838; G06K 9/6261; G06K 9/6262; G06K 9/6256; G06K 9/624; G06K 9/6267; G06K 9/6298; G06N 3/08
  See application file for complete search history.

(56) References Cited

U.S. PATENT DOCUMENTS

| | | | |
|---|---|---|---|
| 9,280,719 B2 | 3/2016 | Criminisi et al. | |
| 9,443,316 B1* | 9/2016 | Takeda ...................... | G06T 7/11 |
| 10,096,122 B1* | 10/2018 | Agrawal ................. | G06T 7/194 |
| 2002/0126396 A1* | 9/2002 | Dolgoff .............. | G02B 27/2278 359/743 |
| 2003/0058237 A1* | 3/2003 | Lee .......................... | G06K 9/38 345/418 |
| 2005/0104878 A1* | 5/2005 | Kaye ....................... | G06T 5/005 345/419 |
| 2010/0014781 A1* | 1/2010 | Liu ...................... | H04N 13/261 382/285 |
| 2010/0046830 A1* | 2/2010 | Wang ........................ | G06T 7/12 382/164 |
| 2012/0106837 A1 | 5/2012 | Partis et al. | |
| 2013/0259374 A1* | 10/2013 | He ........................... | G06K 9/34 382/173 |
| 2016/0325680 A1* | 11/2016 | Curtis ...................... | B60R 1/00 |
| 2017/0236290 A1* | 8/2017 | Sorkine Hornung ..... | G06T 7/11 382/173 |
| 2017/0270674 A1* | 9/2017 | Shrivastava ........ | G06K 9/00771 |
| 2018/0005047 A1* | 1/2018 | Yu .......................... | G06N 3/0454 |
| 2018/0108138 A1* | 4/2018 | Kluckner ............. | G06K 9/3233 |
| 2018/0253865 A1* | 9/2018 | Price .................... | G06K 9/4652 |

OTHER PUBLICATIONS

Tsai, Du-Ming, and Tse-Yun Huang. "Automated surface inspection for statistical textures." Image and Vision connputing21, No. 4 (2003): 307-323. (Year: 2003).*

Culibrk, Dubravko, Oge Marques, Daniel Socek, Hari Kalva, and Borko Furht. "Neural network approach to background modeling for video object segmentation." IEEE Transactions on Neural Networks 18, No. 6 (2007): 1614-1627. (Year: 2007).*

Lu et al., "Dynamic Foreground/Background Extraction from Images and Videos using Random Patches," 8 pages. Retrieved on Oct. 4, 2017. http://www.cs.jhu.edu/~lelu/publication/NIPS06_LuHager_patch.pdf.

Heess et al., "Weakly Supervised Learning of Foreground-Background Segmentation using Masked RBMs," 8 pages. Retrieved on Oct. 4, 2017. http://nicolas.le-roux.name/publications/Heess11_fgbg_segmentation_mrbms.pdf.

Wang et al., "Interactive Object Segmentation in Digital Images by Foreground/Background Region Classification With Hierarchical Queues," Journal of the Chinese Institute of Engineers, Apr. 2009, pp. 427-433, vol. 32, No. 3, 8 pages.

Krizhevsky et al., "ImageNet Classification with Deep Convolutional Neural Networks," Advances in Neural Information Processing Systems 25, 2012, pp. 1106-1114, 9 pages.

Szegedy et al., "Going Deeper with Convolutions," IEEE Conference on Computer Vision and Pattern Recognition (CVPR), 2015, IEEE, 9 pages.

Girshick et al., "Region-based Convolutional Networks for Accurate Object Detection and Segmentation," IEEE Transactions on Pattern Analysis and Machine Intelligence, 2015, pp. 142-158, vol. 38, Issue 1, IEEE, 16 pages.

* cited by examiner

OBJECT CLASSIFICATION BASED ON DECOUPLING A BACKGROUND FROM A FOREGROUND OF AN IMAGE

BACKGROUND

The subject disclosure relates to object classification, and more specifically to object classification based on decoupling a background from a foreground of an image.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified object classification based on decoupling a background from a foreground of an image form as a prelude to the more detailed description that is presented later. In one or more embodiments described herein, systems, computer-implemented methods, apparatuses, and/or computer program products that facilitate object classification based on decoupling a background from a foreground of an image are provided.

According to an embodiment, a system can comprise a memory that stores computer executable components and a processor that executes the computer executable components stored in the memory. The computer executable components can comprise a model that is trained on images that comprise respective backgrounds and respective foregrounds that can be interleaved. The model can be trained to detect the respective backgrounds with a defined confidence level. The computer executable components can also comprise an extraction component that can employ the model to identify a background of a received image based on the defined confidence level and to decouple a foreground object of the received image based on identification of the background of the received image.

According to another embodiment, a computer-implemented method can comprise training, by a system operatively coupled to a processor, a model on identified images that comprise interleaved background portions and foreground portions. The training can comprise training the model to detect the background portions with a defined level of confidence. The computer implemented method can also comprise identifying, by the system, a foreground object of a received image based on a detection of a background section of the received image based on the defined level of confidence. The background section can be detected based on the model.

According to a further embodiment, a computer program product that facilitates object classification is provided. The computer program product can comprise a computer readable storage medium having program instructions embodied therewith, the program instructions can be executable by a processing component to cause the processing component to train a model on images that comprise backgrounds and foreground objects. The backgrounds and the foreground objects can be interleaved. Further, a training of the model can be performed until the model detects the backgrounds at a level of confidence that satisfies a defined level of confidence. The program instructions can also cause the processing component to use the model to identify a background of a received image based on the defined level of confidence and decouple a foreground object of the received image based on the background of the received image.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

An image can comprise foreground object(s) interleaved with a background of the image. It can be difficult to distinguish between the background and the foreground object(s) due to the interleaving. For example, the background can be varying or random. Further, the background can be partially occluded by one or more foreground objects. The various aspects discussed herein relate to a model (e.g., a detection model, a classification model) into which images, with known backgrounds, can be fed. The model can be trained on the images with the known backgrounds. For example, the model can be fed strictly the background images such that the model is trained to detect the backgrounds consistently. Upon or after the model is trained to accurately predict the backgrounds, the model can learn to detect the same backgrounds or unknown backgrounds with a high level of confidence. Based on the detection of the background, the model can separate objects in the foreground. Upon or after separation of the objects in the foreground, classification of the objects can be performed, without distraction from the background portions of the images.

Embodiments described herein comprise systems, computer-implemented methods, and computer program products that can perform object classification on received images. Specifically, one or more of the aspects can perform object classification through training of a model that can detect background portions of an image with a high degree of accuracy. For example, as discussed herein, the various aspects can perform machine learning and more specifically, deep learning based image classification model training and inference. A foreground object can be separated from a background using background recovery based techniques. Upon or after the separation, the decoupled two images (e.g., the foreground and the background) can be fed into a model for training and inference. Accordingly, respective characters and respective information of the foreground and the background can be disentangled, which can result in improved classification accuracy and improved convergence for training.

Figure 1:
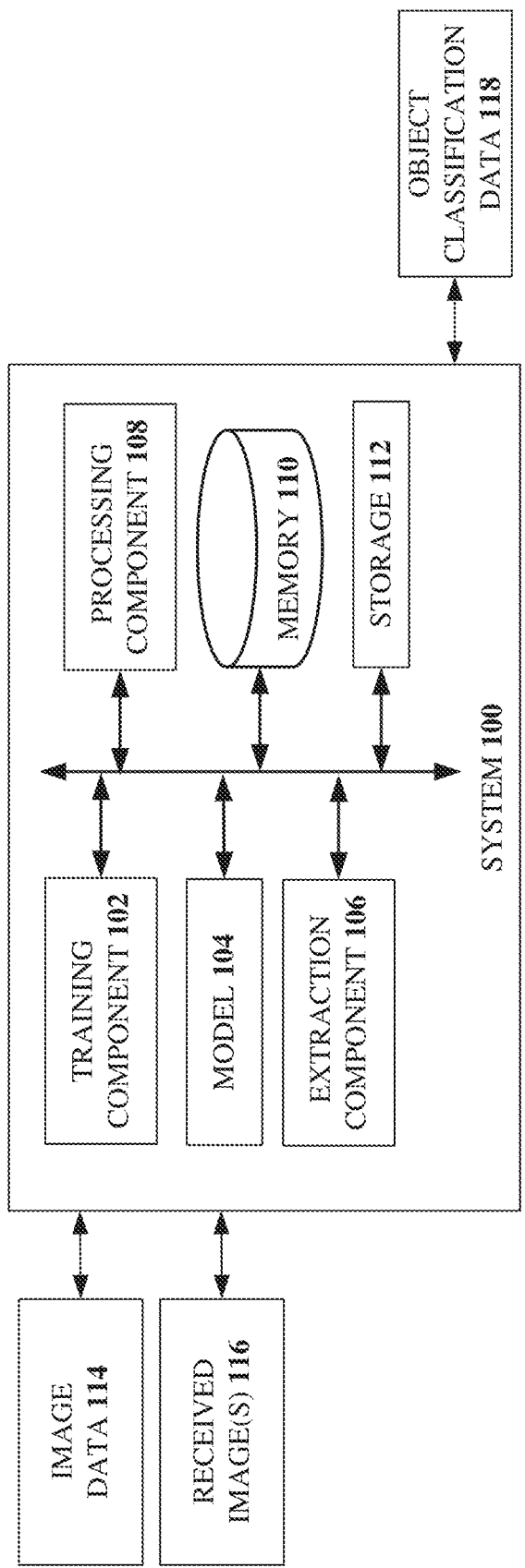
FIG. 1 illustrates a block diagram of an example, non-limiting system that facilitates object classification in accordance with one or more embodiments described herein.

FIG. 1 illustrates a block diagram of an example, non-limiting system 100 that facilitates object classification in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In various embodiments, the system 100 can be a classification computing system associated with technologies such as, but not limited to, computing technologies, artificial intelligence technologies, object classification technologies, medicine and materials technologies, manufacturing technologies, supply chain and logistics technologies, financial services technologies, and/or other digital technologies. The system 100 can employ hardware and/or software to solve problems that are highly technical in nature (e.g., determine a background portion of an image, reconstruct the background portion of an image, decouple the background portion from foreground portions (e.g., objects) in the image, analyze the foreground portions, and classify the foreground portions), that are not abstract and that cannot be performed as a set of mental acts by a human. For example, images received can be complex images that have not previously been analyzed by the system 100, and which comprise interleaving background and foreground portions that are difficult to distinguish with the human eye. Further, the number of images received can be a large volume, which a human could not possibly automatically (e.g., within a matter of seconds or less) and consistently accurately process as discussed herein (e.g., decouple foreground and background portions of the images and perform object classification of the foreground portion). Further, in certain embodiments, some of the processes performed can be performed by one or more specialized computers (e.g., one or more specialized processing units, a specialized computer with a classification computing component, a specialized object classification model, etc.) to carry out defined tasks related to machine learning and object classification as discussed herein.

The system 100 and/or components of the system 100 can be employed to solve new problems that arise through advancements in technologies mentioned above, computer architecture, and/or the like. One or more embodiments of the system 100 can provide technical improvements to computing systems, learning classifier systems, circuit systems, processor systems, artificial intelligence systems, and/or other systems. One or more embodiments of the system 100 can also provide technical improvements to a processor by improving processing performance of the processor and/or improving processing efficiency of the processor. According to some implementations, one or more embodiments of the system 100 can provide technical improvements to a processor by improving an object classification accuracy, facilitating object classification with minimal training data, and being more robust to overfitting.

In the embodiment shown in FIG. 1, the system 100 can comprise a training component 102, a model 104, and extraction component 106, a processing component 108, a memory 110, and/or a storage 112. The memory 110 can store computer executable components and instructions. The processing component 108 (e.g., a processor) can facilitate execution of the instructions (e.g., computer executable components and corresponding instructions) by the training component 102, the model 104, the extraction component 106, and/or other system components. As shown, in some embodiments, one or more of the training component 102, the model 104, the extraction component 106, the processing component 108, the memory 110, and/or the storage 112 can be electrically, communicatively, and/or operatively coupled to one another to perform one or more functions of the system 100.

The training component 102 and/or the model 104 can receive, as input data, image data 114. The image data 114 can include one or more images (e.g., a visual representation), which can be static images such as a photograph (e.g., not a video). The image data 114 can comprise a background and one or more foreground objects, which can be interleaved. For example, it can be difficult to distinguish the foreground objects from the background due to the foreground objects blending into the background, appearing similar, and/or not being able to discern which is the background and which are the foreground objects due to complexity of the background and/or foreground portions. According to some implementations, the image data 114 can comprise a sequence of images. For example, the sequence of images (e.g., image data 114) can be visual representations of circuit boards being manufactured (e.g., undergoing a quality assurance process). Thus, in this example, the background can be the circuit board and the foreground object(s) can be one or more defects.

Based on the input data, the training component 102 can train the model 104, and the model 104 can learn to detect the respective backgrounds of the image data 114 with a defined confidence level. The confidence level can be defined based on an acceptable amount of inaccuracy associated with a classification of objects (e.g., foreground objects, defects) in the image data. To train the model 104, the image data 114 can include at least a first image of only a background and at least a second image of an object placed in front of the same background depicted in the first image. For example, the first image can include a background that comprises a lawn and the second image can include a dog standing in the lawn. In another example, the first image can comprise wallpaper as background and the second image can comprise a vase on a table, with the wallpaper as background. The training component 102 can repeatedly train the model 104, such as a classifier (e.g., a predictor found from a classification algorithm), which can become proficient at detecting background since a pure background (e.g., the first image) has been learned by the model 104. Upon or after the model 104 becomes highly trained to detect backgrounds, one or more foreground objects can be placed in the image with the background to facilitate the training. Continuing the lawn and dog example above, a third image can comprise a blanket and a picnic basket on the lawn (e.g., with or without the dog). Further, a fourth image can comprise a vehicle parked on the lawn (e.g., with or without the dog, the blanket, and/or the picnic basket). According to some implementations, the model 104 can be trained to infer that a portion of an image is a background portion based on a consistency of the data (e.g., lawn, wallpaper, a wall, a set of windows, a landscape, a circuit board).

The extraction component 106 can employ the model 104 to identify a background of a received image 116 (or multiple received images) based on the defined confidence level. The received image 116 can be an image under consideration (e.g., a digital photo of a circuit board being manufactured and undergoing quality assurance review). According to some implementations, the received image 116 can be similar to the image data 114 (e.g., the model 104 can be trained specifically for analysis of the received images). For example, the image data 114 can comprise one or more templates that comprise a "perfect" background and the received image 116 can comprise a background that can be similar to at least one of the templates. However, according to some implementations, the received image 116 can be different from the image data 114.

Based on identification of the background, the extraction component 106 can decouple a foreground object from the received image. For example, upon or after it is determined that the model 104 can accurately classify background portions of an image, the model 104 can be utilized with a new image (e.g., a received image 116) where there is interleaving background and foreground information. The model 104 can determine the background portion of the received image 116 and the extraction component 106 can subtract out the background portion and determine what is in the foreground (e.g., decouple the foreground and the background).

To detect and subtract out the background portion, one or more portions of the background that are obscured by the foreground object can be reconstructed. For example, if the received image is a dog standing on the lawn, the system 100 can reconstruct the background such that the dog (e.g., the foreground object) is removed and the image is only of the lawn. Accordingly, the background portion of the received image can be determined with a high degree of accuracy and the foreground object (e.g., the dog) can be classified according to an object classification model.

The foreground of the image can be output as object classification data 118. For example, according to some implementations, the decoupling can be utilized to classify objects of images. For example, the various aspects discussed herein relate to visual recognition and, specifically, visual classification and visual analytics. Given an image, the system 100 can classify the portions of the image (e.g., the foreground of a received image 116) into different categories (e.g., object classification data 118).

For example, in various implementations, such as manufacturing, there can be defects on a working piece (e.g., a circuit board or other item). An image, such as an electronic image or digital photo, of the working piece can be captured and, for quality assurance purposes, if a defect exists, the system 100 can categorize the defect into different classes (e.g., defect A, defect B, defect C, and so on). The working piece can be processed based on the class to which it has been classified. Different defects can indicate different root causes. For example, some occurrence patterns of defects can indicate manufacturing abnormality and/or different owners can be responsible for certain kinds of defects. In another example, different defects can lead to different treatment (e.g., defect A indicates the items should undergo a polishing process, defect B indicates rework; defect C indicates the working piece should be discarded).

The images (e.g., the received image 116) discussed herein can be uncontrolled images or non-standard images that cannot be classified into a defined category (e.g., a cat, a ball, a building, and so on). The uncontrolled images are images that can be complex, and that are not consistent. Thus, the background and the foreground can be diverse. Further, the various aspects discussed herein do not classify the image into defined or specific categories. Instead, the various aspects can detect a specific object (e.g., a foreground object) inside the image based on fine grain recognition. Further, the various aspects can be related to object classification, not simply object detection.

Figure 2:
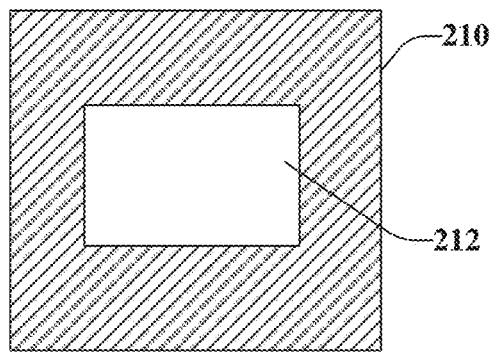
FIG. 2 illustrates example, non-limiting images on which object classification can be performed in accordance with one or more embodiments described herein.
Figure 2:
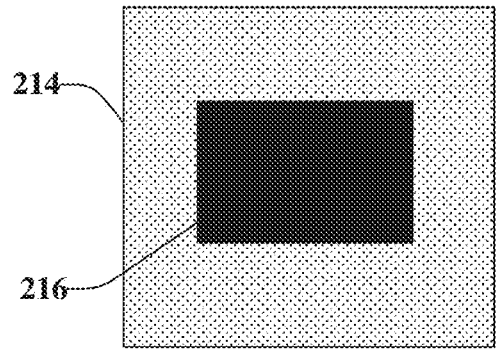
Figure 2:
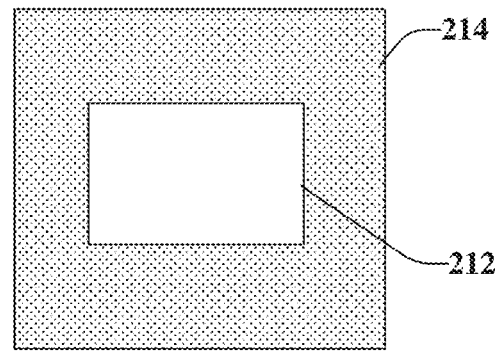
Figure 2:
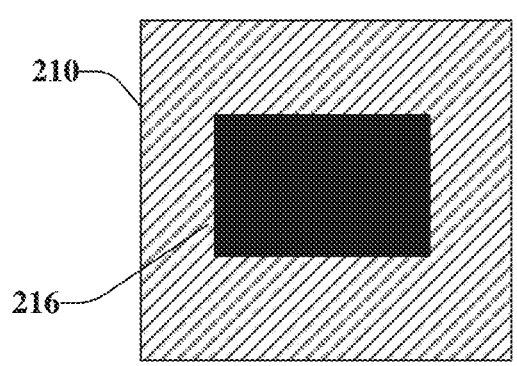

For example, FIG. 2 illustrates example, non-limiting images on which object classification can be performed in accordance with one or more embodiments described herein. The images of FIG. 2 are for example purposes only and images utilized with the disclosed aspects can be more complex. Illustrated are four images: image A 202, image B 204, image C 206, and image D 208. Image A 202 comprises a first background 210 (e.g., Bkg_1) and a first foreground 212 (e.g., Object A or Obj_A). Image B comprises a second background 214 (e.g., Bkg_2) and a second foreground 216 (e.g., Object B or Obj_B). As illustrated, by exchanging the backgrounds and foregrounds of the images, two new images can be created (e.g., image C 206 and image D 208). Thus, image C 206 can comprise the second background 214 and the first foreground 212. Image D 208 can comprise the first background 210 and the second foreground 216.

For weak supervision (which refers to a learning approach that creates its own training day by heuristically retrieving documents for a large query sets), in some classification cases, the object for classification (e.g., the foreground object) can be interleaved with the background. The background can have some specific patterns in appearance across different images under different categories. This can cause overfitting, especially for an end-to-end learning pipeline, such as a deep neural network. In overfitting, a statistical model describes random error or noise (e.g., the background) instead of the underlying relationship (e.g., between the background and the foreground objects).

By changing the backgrounds and foregrounds, as illustrated in FIG. 2, problems can be created related to difficulty distinguishing between Object A (e.g., the first foreground object 212) and Object B (e.g., the second foreground object 216). This can be because the foreground is the same but the background is changed. As an illustrating example, it can be difficult to distinguish between the following examples:

Obj_A+Bkg_1 vs. Obj_B+Bkg_2

Obj_B+Bkg_1 vs. Obj_A+Bkg_2

For the example of FIG. 2, the foregrounds of image A 202 and image C 206 are the same (e.g., the first foreground object 212), however, the backgrounds are different. Further the foregrounds of image B 204 and image D 208 are the same (e.g., the second foreground object 216), however, the backgrounds are different.

For the object classification provided herein, the system 100 can detect and subtract out the background and focus on the foreground (e.g., the defect), which is where the object classification can be performed. The background can be changed repeatedly since the model 104 has been trained to recognize the background, which can be subtracted out of (or removed from) the image by the extraction component 106. Thus, the model 104 can be trained to be robust and not sensitive to background variations. Accordingly, the various aspects can remove ambiguity related to the background and foreground portions of the images, which can decrease a learning cost and can increase a classification accuracy.

In certain embodiments, the model 104 can determine the background portion of the image data 114 and/or the received images 116 based on classifications, correlations, inferences and/or expressions associated with principles of artificial intelligence. For instance, the model 104, other classification models, as well as the system components, can employ an automatic classification system and/or an automatic classification process to determine which portions of the images are the background portion and which portions of the image are the foreground object. In one example, the model 104 can employ a probabilistic and/or statistical-based analysis (e.g., factoring into the analysis utilities and costs) to learn and/or generate inferences with respect to the respective portions of the one or more images and corresponding classifications of the foreground objects. In an aspect, the system 100 can comprise an inference component (not shown) that can further enhance automated aspects of the model 104 utilizing in part inference based schemes to facilitate learning and/or generating inferences associated with the portions of the images and a classification that should be applied in order to increase a classification accuracy. The system 100 can employ any suitable machine-learning based techniques, statistical-based techniques, and/or probabilistic-based techniques. For example, the system 100 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the system 100 can perform a set of machine learning computations associated with decoupling respective background portions and respective foreground portions of images. For example, the system 100 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to decouple respective background portions and respective foreground portions of images.

It is to be appreciated that the system 100 (e.g., the training component 102, the model 104, and/or the extraction component 106, as well as other system components) performs a decoupling and/or an object classification that cannot be performed by a human (e.g., is greater than the capability of a single human mind). For example, an amount of data processed, a speed of data processed, and/or data types of data processed by the system 100 (e.g., the training component 102, the model 104, and/or the extraction component 106) over a certain period of time can be greater, faster, and different than an amount, speed, and data type that can be processed by a single human mind over the same period of time. The system 100 (e.g., the training component 102, the model 104, and/or the extraction component 106) can also be fully operational towards performing one or more other functions (e.g., fully powered on, fully executed, etc.) while also performing the above-referenced image analysis and/or object classification processes. Moreover, the decoupling and/or the object classification generated and coordinated by the system 100 (e.g., the training component 102, the model 104, and/or the extraction component 106) can include information that is impossible to obtain manually by a user. For example, a type of information included in the image data 114 and/or the received images 116, a variety of information associated with the image data 114 and/or the received images 116, and/or optimization of the image data 114 and/or the received images 116 to generate and output the one or more object classification data 118 can be more complex than information that can be obtained manually and processed by a user.

Figure 3:
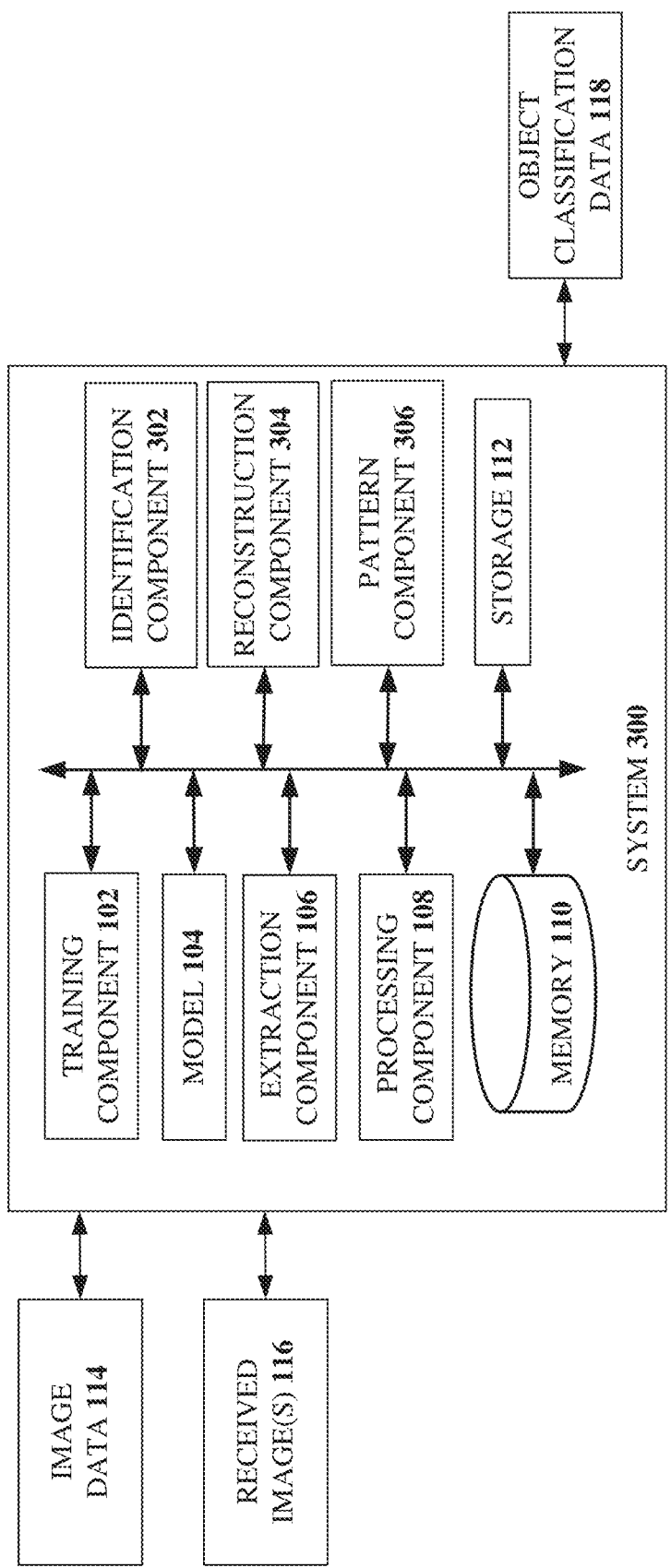
FIG. 3 illustrates a block diagram of an example, non-limiting system that reconstructs a background portion of an image to facilitate object classification in accordance with one or more embodiments described herein.

FIG. 3 illustrates a block diagram of an example, non-limiting system 300 that reconstructs a background portion of an image to facilitate object classification in accordance with one or more embodiments described herein. Repetitive description of like elements employed in other embodiments described herein is omitted for sake of brevity.

The system 300 can comprise one or more of the components and/or functionality of the system 100, and vice versa. To train the model 104 on the image data 114, the training component 102 can perform training on classifiers to detect background images. For example, thousands of images of backgrounds (e.g., image data 114) can be input into the model 104. Multiple images of the thousands of images can comprise the same background, or can comprise different backgrounds. Thereafter, thousands of images with the same backgrounds and with one or more foreground objects can be input into the model 104. Accordingly, the model 104 can be trained to detect the backgrounds even when one or more foreground objects can be occluding one or more portions of the backgrounds. According to some implementations, the training can include detecting depth and/or uniformity of the backgrounds. Accordingly, the training component 102 can train the model 104 with a training set of images of only the backgrounds, and then images of that same background with one or more objects in the foreground. Therefore, the model 104 can become proficient at detecting the background portions of images.

Thus, when one or more images are received (e.g., received images 116), the background portions and foreground portions can be identified by the model 104. For example, a single static image can be received and the model 104 can perform the identification on this single static image at a high processing volume. Performing the identification between the background portions and the foreground portions is more complex for a static image as compared with videography. For example, for videography, where a green screen can be used, foreground objects tend to be in motion and, therefore, it can be easier to distinguish the foreground object over multiple frames. Therefore, techniques used for videography cannot be applied for use on a single static image, with interleaving background and foreground portions, as discussed herein.

The system 300 can include an identification component 302, a reconstruction component 304, and a pattern component 306. Upon or after the classifier is established, new images (e.g., the received images 116) that comprise interleaving foreground and background portions can be received and the identification component 302 can initially identify the background. To identify the background portion, the identification component 302 can utilize one or more templates to determine the background portion. In another example, the identification component 302 can determine a periodicity (or pattern) associated with the background portion.

Upon or after the background is identified by the identification component 302, the reconstruction component 304 can reconstruct the background. For example, the reconstruction component 304 can complete the background such that portions of the background obscured by the one or more foreground objects can be recreated. As an example, the reconstruction component 304 can utilize a template identified by the identification component to perform the reconstruction. In another example, the reconstruction component can utilize the periodicity of the background portion to reconstruct the background.

Figure 4:
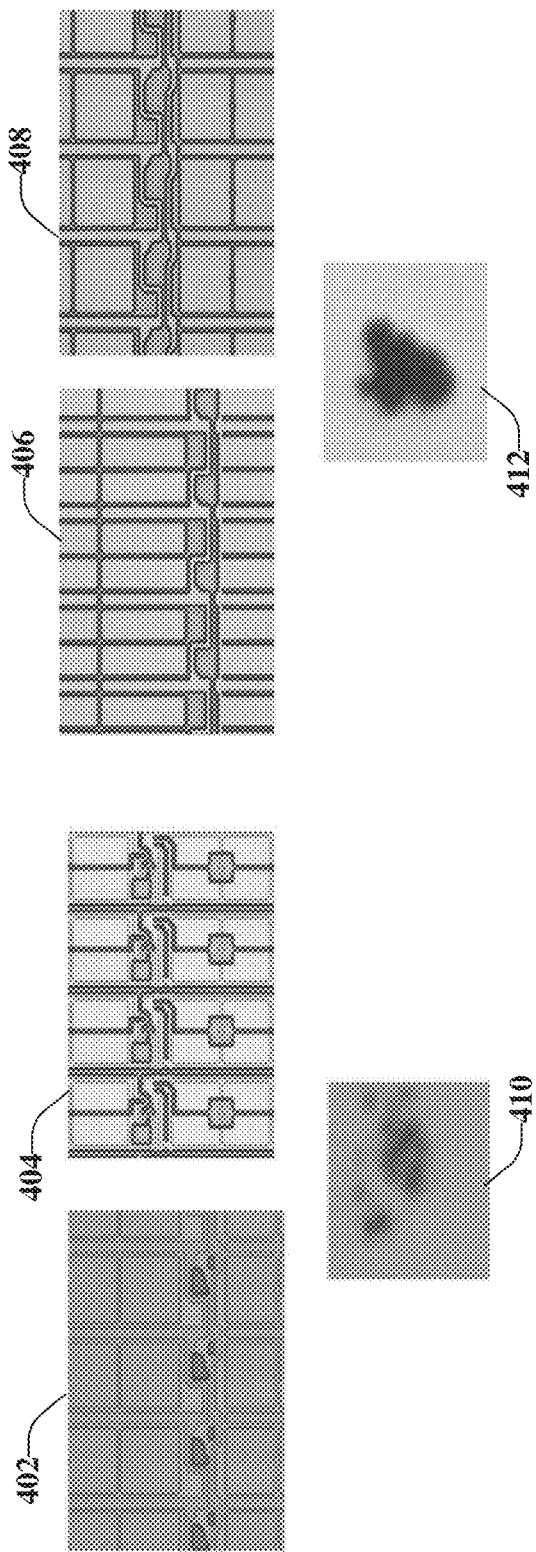
FIG. 4 illustrates example, non-limiting images decoupled into a background portion and a foreground object portion in accordance with one or more embodiments described herein.

As another example, FIG. 4 illustrates example, non-limiting images decoupled into a background portion and a foreground object portion in accordance with one or more embodiments described herein. Repetitive description of like elements employed in other embodiments described herein is omitted for sake of brevity.

The images of FIG. 4 relate to a manufacturing production pipeline. Illustrated are a first background image 402, a second background image 404, a third background image 406, and a fourth background image 408. The one or more background images can be different from one another, as illustrated in FIG. 4. Also illustrated are two degrees of defects, namely, a first defect 410 and a second defect 412. In this example, the first background image 402 and the second background image 404 share the first defect 410 (e.g., respective first defects are included in a first received image that comprises the first background image 402 and a second received image that comprises the second background image 404). Further, the third background image 406 and the fourth background image 408 share the second defect 412 (e.g., respective second defects are included on a third received image that comprises the third background image 406 and a fourth received image that comprises the fourth background image 408).

Although the backgrounds are diverse, which can be misleading during the observation, the identification component 302 can distinguish between the backgrounds, not the foregrounds. Accordingly, the complexity of the image can be decoupled. Therefore, instead of separating the foreground, the background can be copied, or reconstructed by the reconstruction component 304.

For example, the reconstruction component 304 can recover the complete background. The recovered background image can be input into the model 104. Since the system 300 performed the classification mainly by object, rather than background, the two parts (background and foreground) should be decoupled. It is noted that although the system 300 decouples the background and the foreground, the system 300 (e.g., the model 104) does not use only the pure object part (e.g., the foreground) for object classification. Instead, the background can also be utilized during the object classification because sometimes the foreground/object extraction can be more difficult than background recovery (e.g., would utilize a fine-grained alignment). Further, sometimes the object category can be statistically related to the background. For example, the background information can provide additional cues about the object, which can be utilized to facilitate the object classification.

Figure 5:
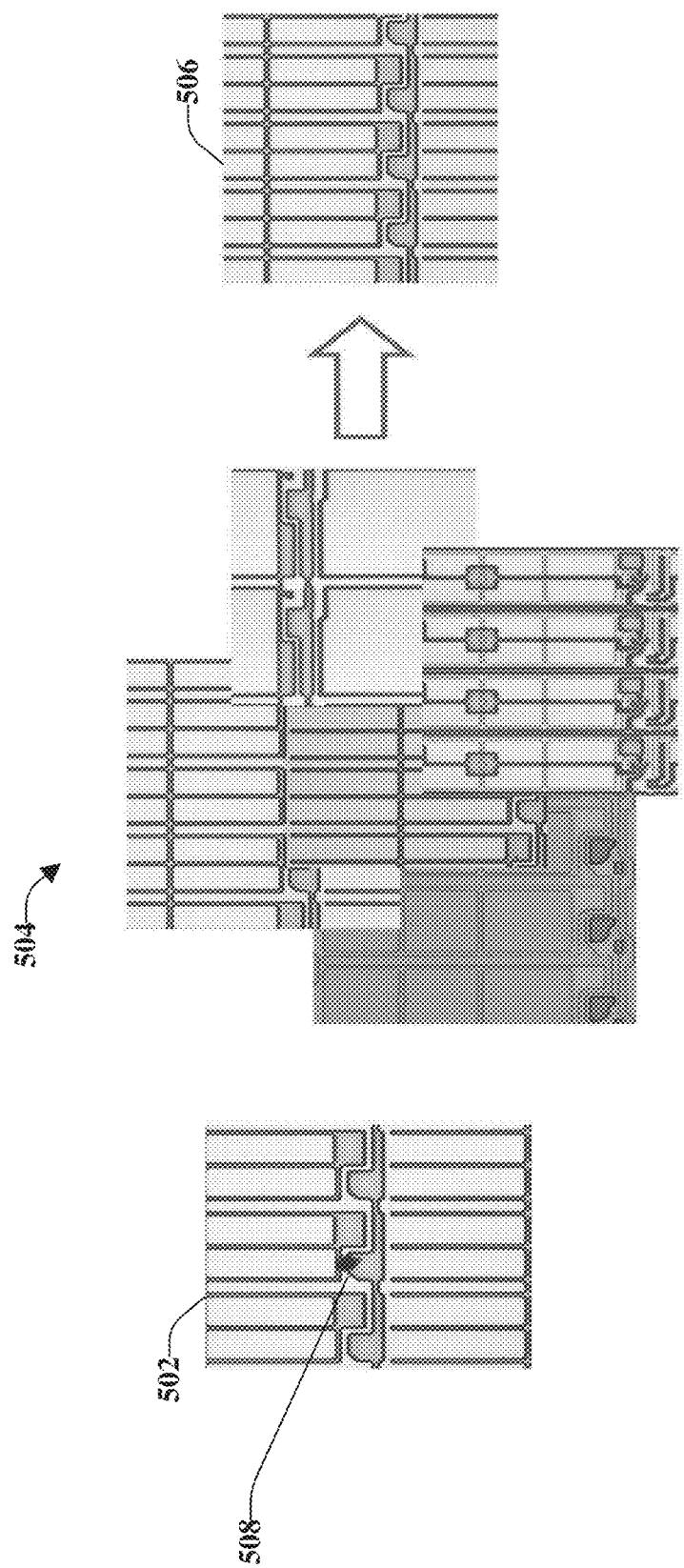
FIG. 5 illustrates an example, non-limiting background extractor that utilizes templates in accordance with one or more embodiments described herein.

According to some implementations, to identify the background, the identification component 302 can obtain information related to one or more templates that can be utilized with the disclosed aspects. For example, FIG. 5 illustrates an example, non-limiting background extractor that utilizes templates in accordance with one or more embodiments described herein. Repetitive description of like elements employed in other embodiments described herein is omitted for sake of brevity.

As illustrated a query image 502 (e.g., the received image 116) can be received. The model 104 can be trained on defined templates 504 (e.g., the image data 114) prior to receipt of the query image 502. Based on the templates retained in memory (e.g., the memory 110, the storage 112). The reconstruction component 304 can output a reconstructed background 506. The reconstructed background 506 can be based on the query image 502 and the defined templates 504. For example, the reconstruction component 304 can match the query image 502 to the defined templates 504 to determine the most similar template of the defined templates 504 that matches the query image 502. Differences between the defined templates 504 and the query image 502 can be due to foreground objects (e.g., defects) included within the query image 502. Accordingly, additional background information can be derived from the templates for the portions of the background obscured by the defect(s).

It is noted that although only five defined templates are illustrated, the various aspects disclosed herein can utilize a multitude of templates to facilitate template memory based background image generation. Further, the defined templates 504 can be a batch of perfect (e.g., contain no defects) templates. As illustrated, the defined templates 504 (e.g., the background portions of images) can be complex and difficult to discern with a human eye. Further, a defect 508 within the query image 502 can also be difficult to discern with a human eye due to the complexity of the background portion of the image.

Figure 6:
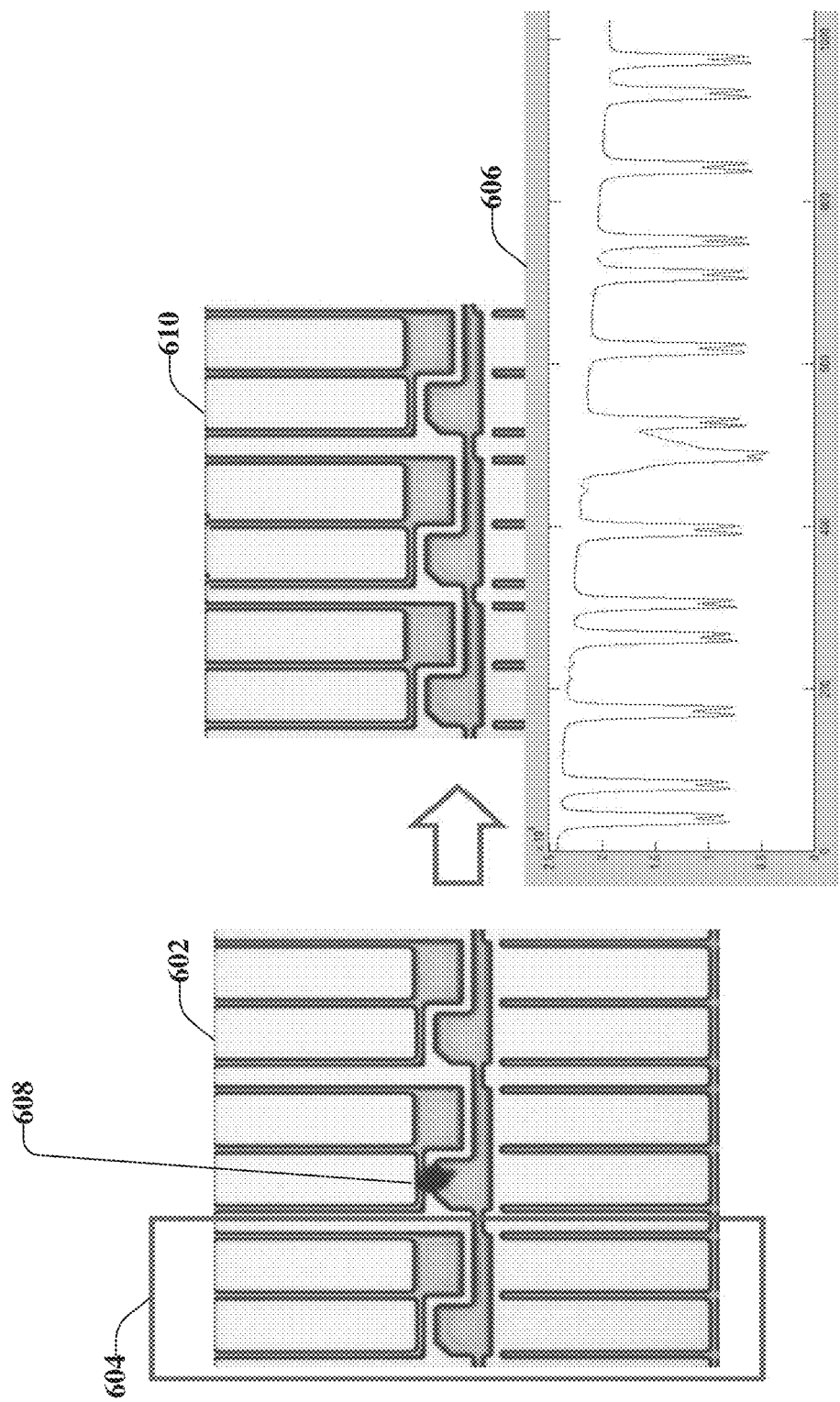
FIG. 6 illustrates an example, non-limiting non-template background generation in accordance with one or more embodiments described herein.

According to some implementations, non-template background generation can be utilized by the reconstruction component 304 to complete the background. For example, the pattern component 306 can identify a repeated pattern associated with the background section. FIG. 6 illustrates an example, non-limiting non-template background generation in accordance with one or more embodiments described herein. Repetitive description of like elements employed in other embodiments described herein is omitted for sake of brevity.

Illustrated in FIG. 6 is an image 602 (e.g., the received image 116). To determine the repeated pattern, the pattern component 306 can divide the image 602 into sections. A first section is illustrated by bounding box 604. The pattern component 306 can determine the sections based on period detection. For example, the image 602 can be scanned and repeated patterns within the image 602 can be tracked to determine the number of repeated patterns, which can be based on a computer-generated period detection waveform 606 according to an implementation. In the example of FIG. 6, there is a single pattern repeated, from left to right (e.g., the first period of the pattern is represented within the bounding box 604). However, according to some implementations, a received image 116 can comprise one, or more than one repeated pattern. Based on the pattern determined by the pattern component 306, the reconstruction component 304 can recreate the background (without the defect 608) as a reconstructed background 610.

For example, since the pattern repeats, there is a period where the reconstruction component 304 can identify the outlier (e.g., the defect 608). To detect the outlier, the bounding box 604 can be moved from its current location of FIG. 6 to the next pattern and so on throughout the image. In some implementations, to reconstruct the image the reconstruction component 304 can copy a period determined to not include an outlier (e.g., the defect 608). For example, to reconstruct the image 602, the reconstruction component 304 can copy the first period represented within the bounding box 604 to create a second period (e.g., the period that includes the defect 608).

According to some implementations, the reconstruction component 304 can reconstruct the image based on image inpainting by machine learning. Inpainting is the process of reconstructing lost or deteriorate sections of images and can also be referred to an image interpolation. To perform the inpainting, algorithms can be applied to replace lost portions of the images (e.g., the portion(s) of the background obscured by the defect(s)). According to some implementations, one or more of template detection, pattern recognition, and/or inpainting can be utilized by the reconstruction component 304 to reconstruct the background portion.

Figure 7:
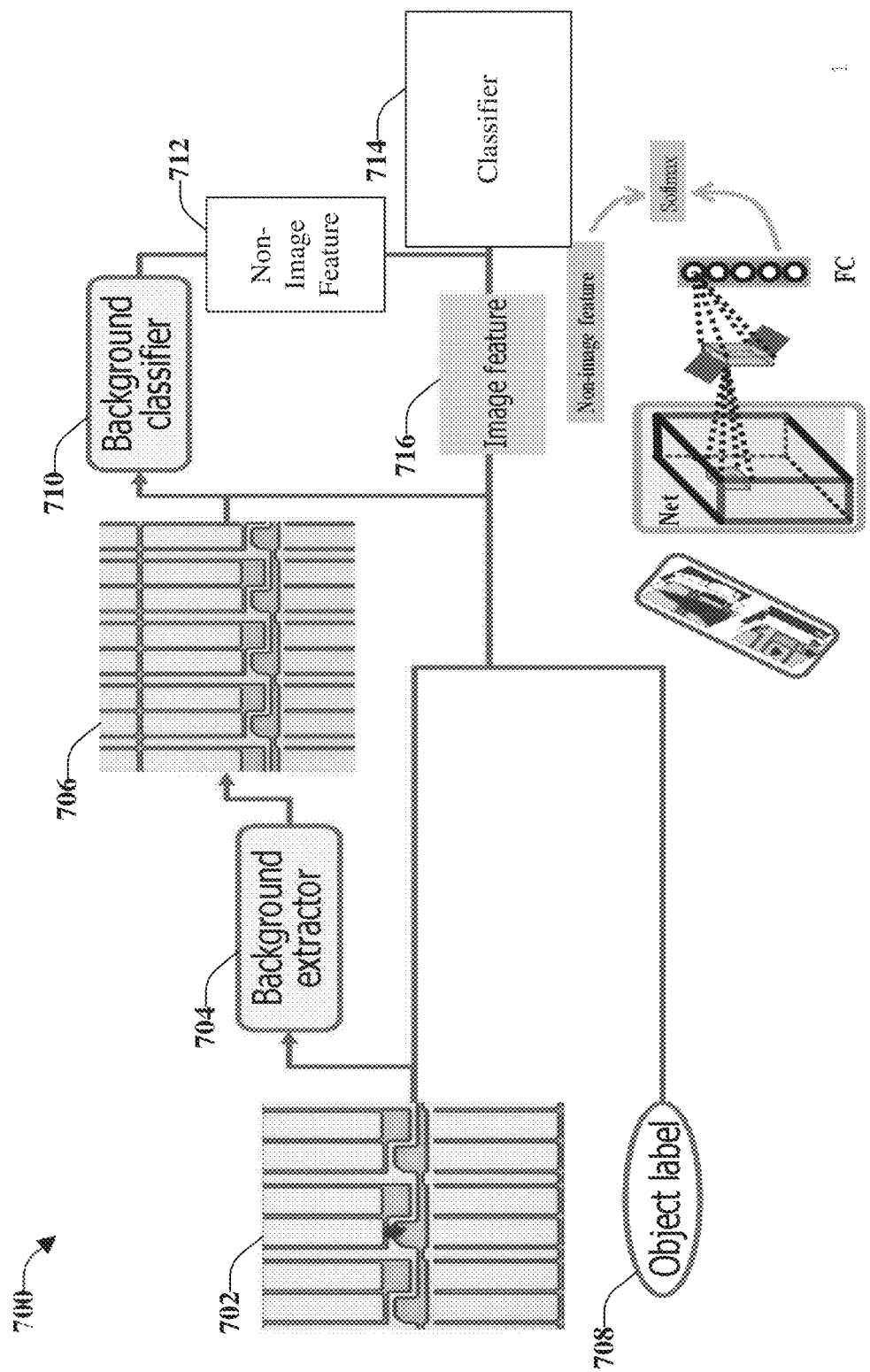
FIG. 7 illustrates an example, non-limiting system for classifying objects based on extracting a background portion of an image from a foreground portion of the image in accordance with one or more embodiments described herein.

FIG. 7 illustrates an example, non-limiting system 700 for classifying objects based on extracting a background portion of an image from a foreground portion of the image in accordance with one or more embodiments described herein. Repetitive description of like elements employed in other embodiments described herein is omitted for sake of brevity.

The system 700 can comprise one or more of the components and/or functionality of the system 100, the system 300, and vice versa. Illustrated is an image 702 (e.g., a received image 116) for which object classification is to be performed. The image 702 can be processed through a background extractor 704. For example, the background extractor 704 can include the functionality of the identification component 302, the reconstruction component 304, and/or the pattern component 306. An output of the background extractor 704 can be a recovered background 706 (e.g., the reconstructed image 506, the reconstructed image 610). For example, the background extractor 704 can utilize a set of templates, as described with respect to FIG. 5, to create the recovered background image 706. In another example, the background extractor 704 can utilize pattern recognition, as described with respect to FIG. 6, to create the recovered background 706. In a further example, the background extractor 704 can utilize inpainting to create the recovered background 706.

Information related to the recovered background 706 and on object label 708 can be input into a model. For example, a background classifier 710 can receive as input the recovered background image 706. According to some implementations, the background of the image can provide information related (e.g., statistically related) to the foreground of the image. The background classifier 710 can output a non-image feature 712 of the image, which can be input to a classifier 714 with an image feature 716. The classifier 714 can be, for example, a convolutional neural network.

Accordingly, the system 700 can comprise a multi-channel and multi-modal classifier. For example, the background can be decoupled from the foreground for classification by background generation. Further, the background channel can be combined with the foreground for learning. The multi-channel and multi-modal classifier can provide robust classification. For example, background aware visual object classification can be provided. In addition, since the foreground and background can be decoupled, the disturbance information can be decoupled from the object appearance. In addition, the various aspects can provide a model that can be learned with a focus on object parts, without distraction from the background part. This can be accomplished by decoupling the background from the foreground.

Figure 8:
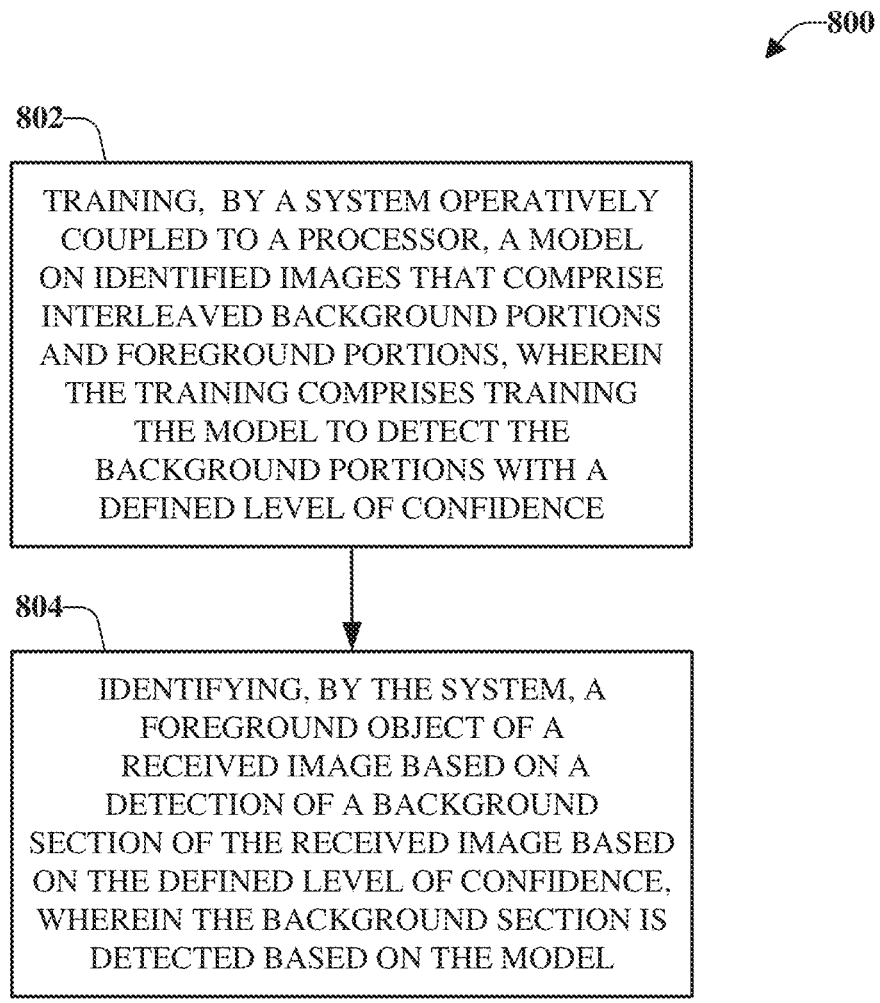
FIG. 8 illustrates a flow diagram of an example, non-limiting computer-implemented method that facilitates object classification in accordance with one or more embodiments described herein.

FIG. 8 illustrates a flow diagram of an example, non-limiting computer-implemented method 800 that facilitates object classification in accordance with one or more embodiments described herein. Repetitive description of like elements employed in other embodiments described herein is omitted for sake of brevity.

At 802 of the computer-implemented method 800, a system operatively coupled to a processor can train a model on identified images that comprise interleaved background portions and foreground portions (e.g., via the training component 102). Training the model can comprise training the model to detect the background portions with a defined level of confidence.

For example, to train the model, a multitude of images can be input into the model. Information related to identifying the background portions of the images can be input to the model (e.g., background consistency information, templates, pattern recognition). Thus, the model can be trained to detect backgrounds of images based on known background images. In this manner, the model can be trained to detect the background portions with a high percentage of accuracy. Upon or after the model is trained on the background portions, foreground objects can be placed in the images with the known background images. Based on the information, the model can learn to detect the foreground portions, since the background portions have been identified.

Further, the computer-implemented method 800 can include, at 804, identifying, by the system, a foreground object of a received image based on a detection of a background section of the received image based on the defined level of confidence (e.g., via the extraction component 106). The background section can be detected based on the model. For example, as discussed above, the model can be trained to detect the background portions of images with a high degree of accuracy. Therefore, since the model is trained to know what the background should be, the foreground of the images can be determined. Further, according to some implementations, the model can be a multi-channel classifier that classifies the received image into an object category. For example, the object category can be statistically related to the background of the received image.

Figure 9:
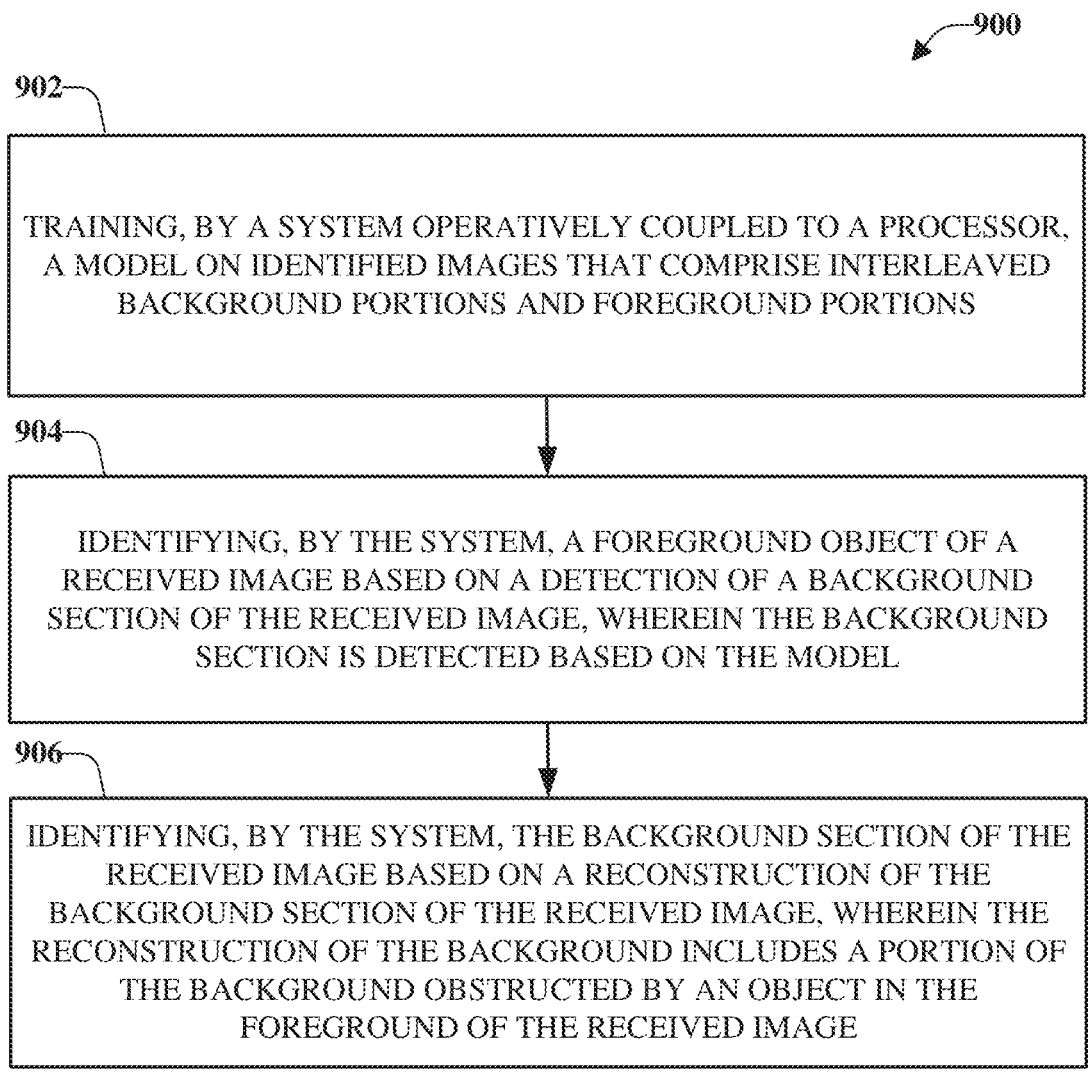
FIG. 9 illustrates a flow diagram of an example, non-limiting computer-implemented method that facilitates reconstruction of background sections of a received image to perform object classification in accordance with one or more embodiments described herein.

FIG. 9 illustrates a flow diagram of an example, non-limiting computer-implemented method 900 that facilitates reconstruction of background sections of a received image to perform object classification in accordance with one or more embodiments described herein. Repetitive description of like elements employed in other embodiments described herein is omitted for sake of brevity.

At 902 of the computer-implemented method 900, a system operatively coupled to a processor can train a model on identified images that comprise interleaved background portions and foreground portions (e.g., via a training component 102). The model can be a multi-channel classifier that classifies the received image into an object category.

According to some implementations, training the model can comprise training, by the system, the model to detect the respective backgrounds based on inputting into the model first images that comprise defined backgrounds, without foreground objects. Further to these implementations, the computer-implemented method can include training the model, by the system, based on inputting second images that comprise one or more foreground objects that obstruct respective areas of the defined backgrounds.

A foreground object of a received image can be identified at 1004 of the computer-implemented method 900 (e.g., via the identification component 302). The received image can be a single image that is not related to other received images. The foreground object can be identified based on a detection of a background section of the received image. According to an implementation, the background section can be detected based on the model. For example, the background section can comprise at least one known background portion of the known background portions used to train the model. However, the disclosed aspects are not limited to this implementation and the background section can comprise unknown (or not previously received) background portions.

According to some implementations, the background section of the received image can be identified, at 906 of the computer-implemented method 900 based on a reconstruction of the background section of the received image (e.g., via the reconstruction component 304). For example, the reconstruction of the background can include reconstruction of a portion of the background obstructed by an object in the foreground of the received image. In some implementations, the reconstruction of the background section of the received image can comprise using background recovery to decouple the foreground object from the background of the received image. According to some implementations, the reconstruction of the portion of the background can comprise using, by the system, machine learning to re-create the background based on an image inpainting.

Figure 10:
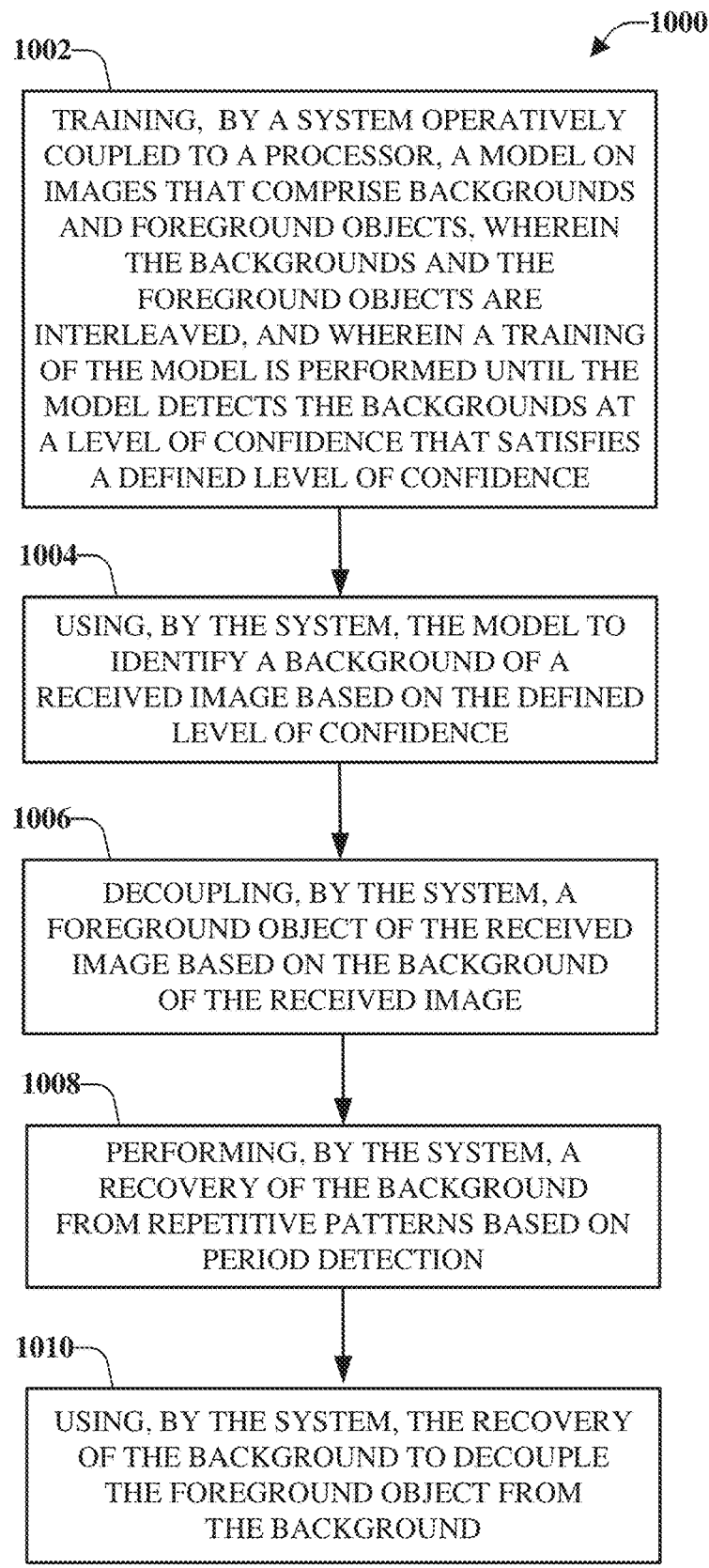
FIG. 10 illustrates a flow diagram of an example, non-limiting computer-implemented method that facilitates decoupled weakly supervised object classification in accordance with one or more embodiments described herein.

FIG. 10 illustrates a flow diagram of an example, non-limiting computer-implemented method 1000 that facilitates decoupled weakly supervised object classification in accordance with one or more embodiments described herein. Repetitive description of like elements employed in other embodiments described herein is omitted for sake of brevity.

At 1002 of the computer-implemented method 1000, a system operatively coupled to a processor can train a model on images that comprise backgrounds and foreground objects (e.g., via the training component 102). The backgrounds and the foreground objects can be interleaved. Training of the model can be performed until the model detects the backgrounds at a level of confidence that satisfies a defined level of confidence. The model can be a multi-channel classifier that classifies the received image into an object category.

The model can be used, at 1004 of the computer-implemented method 1000 to identify a background of a received image (e.g., via the identification component 302). At 1006 of the computer-implemented method 1000, the system can decouple a foreground object of the received image based on the background of the received image based on the defined level of confidence (e.g., via the extraction component 106).

According to some implementations, the computer-implemented method 1000 can include, at 1008, performing a recovery of the background from repetitive patterns based on period detection (e.g., via the pattern component 306). For example, a pattern associated with the background can be a repeated pattern. According to some implementations, the pattern can comprise a repeated periodicity.

Further, the computer-implemented method 1000 can include using the recovery of the background to decouple the foreground object from the background (e.g., via the extraction component 106). For example, based on the repetitive patterns in the background, the background can be reconstructed and a foreground object can be determined based on the reconstruction.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 11:
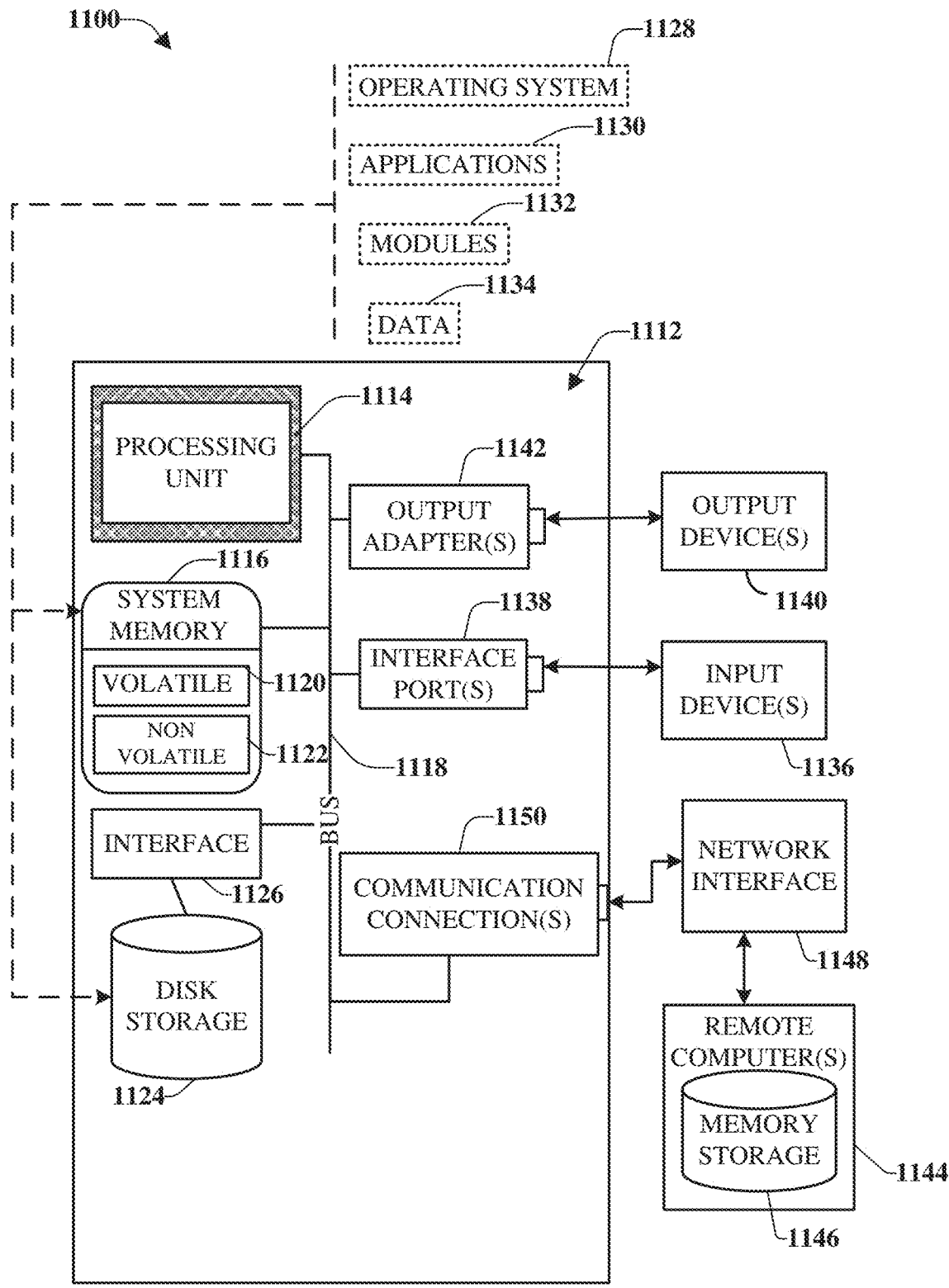
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/nonvolatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a method of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components; and
 a processor that executes the computer executable components stored in the memory, wherein the computer executable components comprise:
  a model that is trained on images that comprise respective backgrounds and respective foregrounds that are interleaved, wherein the model is trained to detect the respective backgrounds with a defined confidence level, wherein the images comprise one or more templates that comprise a background meeting a defined criterion; and
  an extraction component that employs the model to identify a background of a received image based on the defined confidence level and to decouple a foreground object of the received image based on identification of the background of the received image, wherein the model is employed to compare the one or more templates to the received image to identify a portion of the received image that matches the one or more templates at the confidence level.

2. The system of claim 1, wherein the model is a multi-channel classifier that classifies the received image into an object category, and wherein a training of the model increases a classification accuracy of the model.

3. The system of claim 2, wherein the object category is statistically related to the background of the received image.

4. The system of claim 1, wherein the model is trained to detect the respective backgrounds based on known background images.

5. The system of claim 4, wherein the model is trained by placing the foreground object with the known background images.

6. The system of claim 1, wherein the extraction component uses background recovery to decouple the foreground object from the background of the received image.

7. The system of claim 1, wherein the received image is a single image not related to other received images.

8. The system of claim 1, wherein the computer executable components further comprise:
 a pattern component that performs a recovery of the background of the received image from repetitive patterns based on period detection, wherein the extraction component uses the recovery of the background to decouple the foreground object from the background of the received image.

9. A computer-implemented method, comprising:
 training, by a system operatively coupled to a processor, a model on identified images that comprise interleaved background portions and foreground portions, wherein the training comprises training the model to detect the background portions with a defined level of confidence, and wherein the identified images are one or more templates that comprise a background meeting a defined criterion; and
 identifying, by the system, a foreground object of a received image based on a detection of a background section of the received image based on the defined level of confidence, wherein the background section is detected based on the model, wherein the model is employed to compare the one or more templates to the received image to identify a portion of the received image that matches the one or more templates at the defined level of confidence.

10. The computer-implemented method of claim 9, wherein the identifying the foreground object comprises removing, by the system, the background section from the received image.

11. The computer-implemented method of claim 9, further comprising:
 identifying, by the system, the background section of the received image based on a repeated pattern associated with the background section.

12. The computer-implemented method of claim 9, further comprising:
 identifying, by the system, the background section of the received image based on a reconstruction of the background section of the received image, wherein the reconstruction of the background section of the received image includes a portion of the background section of the received image obstructed by an object in a foreground of the received image, and wherein the reconstruction of the background increases a classification accuracy of the model.

13. The computer-implemented method of claim 12, wherein the reconstruction of the portion of the background section of the received image comprises using, by the system, machine learning to re-create the background section of the received image based on an image inpainting.

14. The computer-implemented method of claim 9, wherein the training the model comprises training, by the system, the model to detect the backgrounds portions based on inputting into the model first images that comprise defined backgrounds.

15. The computer-implemented method of claim 14, further comprising:
 training, by the system, the model based on inputting second images that comprise foreground objects that obstruct respective areas of the defined backgrounds.

16. The computer-implemented method of claim 9, wherein the model is a multi-channel classifier that classifies the received image into an object category.

17. A computer program product that facilitates object classification, the computer program product comprising a computer readable storage medium having program instructions embodied therewith, the program instructions are executable by a processor to cause the processor to:
 train a model on images that comprise backgrounds and foreground objects, wherein the images are templates that comprise a first background meeting a defined criterion, wherein the backgrounds and the foreground objects are interleaved, and wherein a training of the model is performed until the model detects the backgrounds at a level of confidence that satisfies a defined level of confidence;
 use the model to identify a second background of a received image based on the defined level of confidence; and
 decouple a foreground object of the received image based on the second background of the received image, and a comparison of the templates to the received image to identify a portion of the received image that matches the templates at the level of confidence that satisfies the defined level of confidence.

18. The computer program product of claim 17, wherein the model is a multi-channel classifier that classifies the received image into an object category.

19. The computer program product of claim 17, wherein the program instructions cause the processor to utilize background recovery to decouple the foreground object of the received image from the second background of the received image.

20. The computer program product of claim 17, wherein the program instructions cause the processor to: perform a recovery of the second background from repetitive patterns based on period detection; and use the recovery of the second background to decouple the foreground object of the received image from the second background.

* * * * *